June 23, 1931.  M. B. MORGAN  1,811,058
WORM DRIVE AXLE
Filed Nov. 25, 1929  2 Sheets-Sheet 1

INVENTOR.
HIS ATTORNEYS.

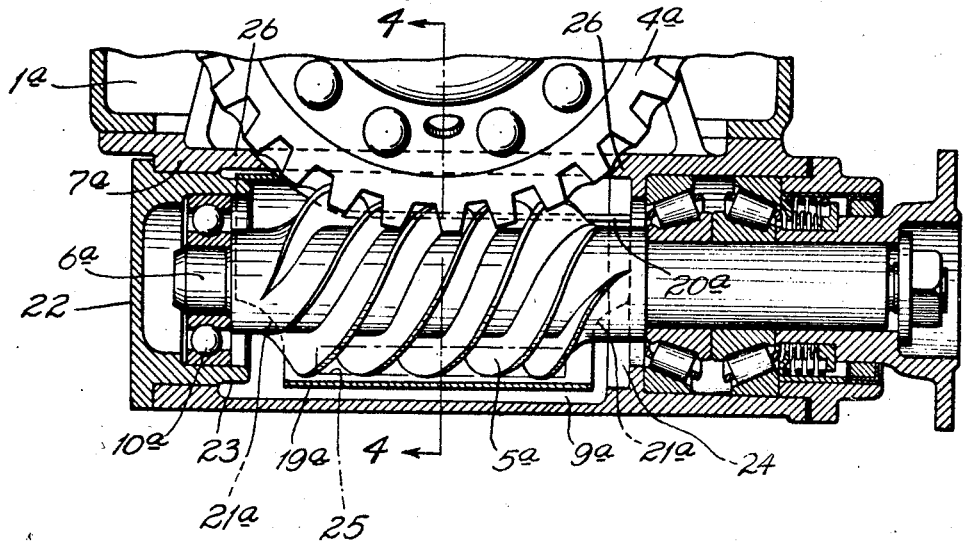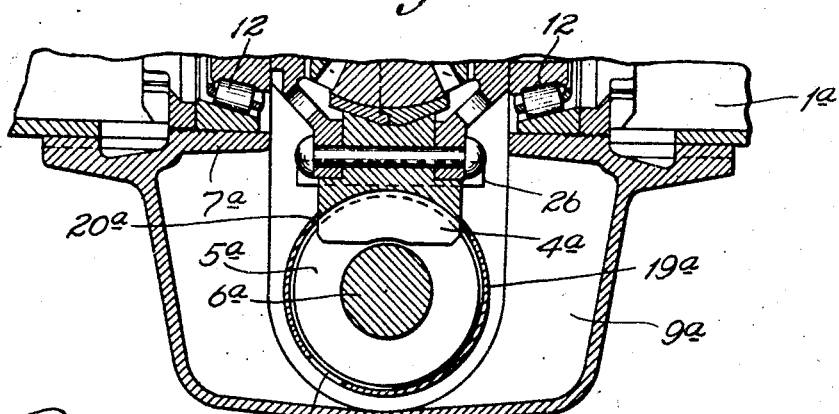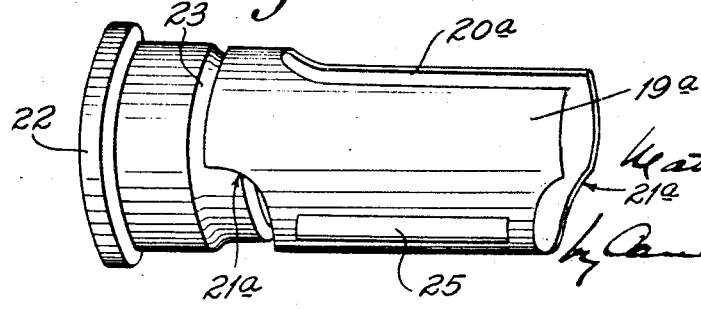

Patented June 23, 1931

1,811,058

UNITED STATES PATENT OFFICE

MATHEW B. MORGAN, OF DETROIT, MICHIGAN, ASSIGNOR TO THE TIMKEN-DETROIT AXLE COMPANY, OF DETROIT, MICHIGAN, A CORPORATION OF OHIO

WORM DRIVE AXLE

Application filed November 25, 1929. Serial No. 409,517.

This invention relates to automobile driving axles of the worm gear type wherein the worm is located beneath the worm wheel and runs in lubricant contained in the lower part of the axle. Such arrangement provides satisfactory lubrication of the intermeshing portions of the worm and worm gear at low speeds. At high speeds, however, the pumping action of the worm and worm wheel tends to force the lubricant above the worm and thus prevent proper lubrication of the intermeshing teeth of the worm and worm wheel. The principal object of the present invention is to overcome the above disadvantage. Other objects are simplicity and cheapness of construction, fewness of parts and compactness of design. The invention consists in providing the axle with means for holding the lubricant around the worm and for delivering such lubricant under pressure to the entering sides of the worm and worm wheel. It also consists in the construction, combinations and arrangements of parts hereinafter described and claimed.

Figure 1:
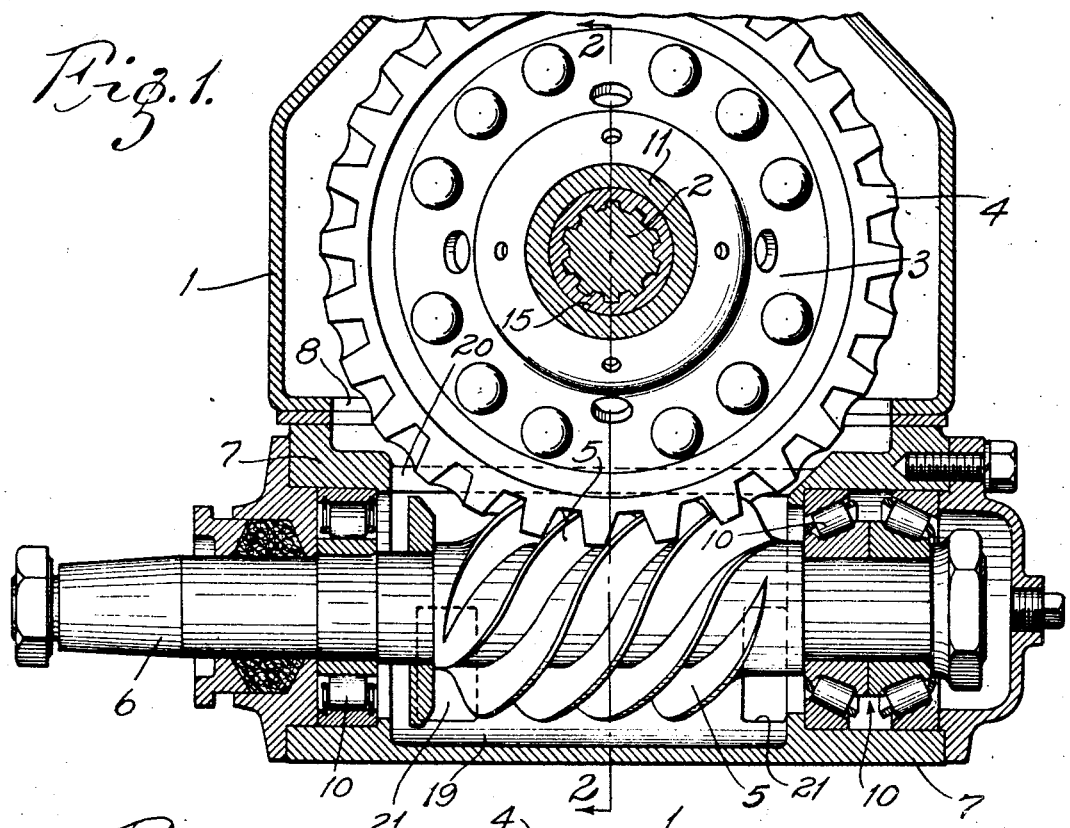
Figure 2:
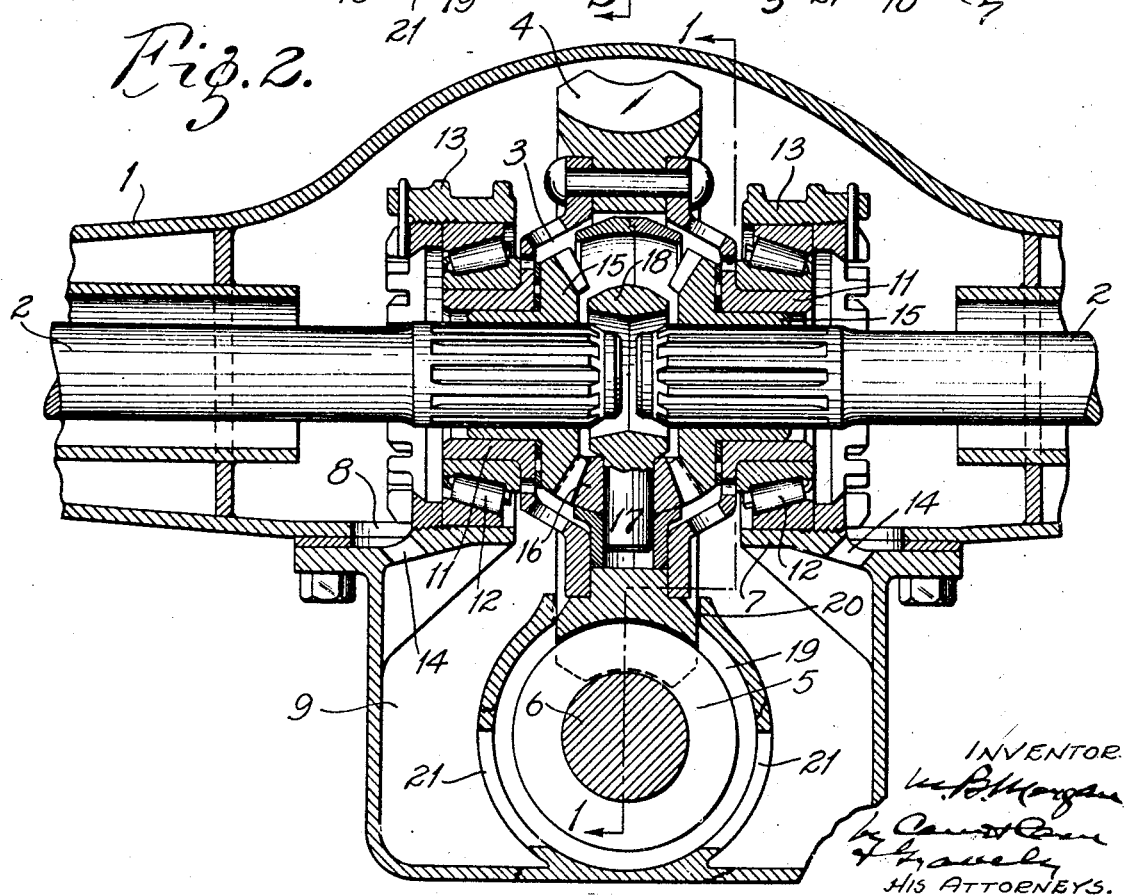

In the accompanying drawings, which forms part of this specification and wherein like symbols refer to like parts wherever they occur, Fig. 1 is a vertical longitudinal section through the middle portion of a worm drive automobile axle embodying my invention, Fig. 2 is a transverse vertical section on the line 2—2 in Fig. 1, Fig. 3 is a vertical longitudinal section through the middle portion of a worm drive automobile axle, showing a modified form of the invention, Fig. 4 is a transverse vertical section on the line 4—4 in Fig. 3; and Fig. 5 is a perspective view showing the shroud fitted on the closure cap for the worm receiving opening in the rear end of the carrier.

Referring to Figs. 1 and 2 of the accompanying drawings, my invention is shown in connection with a worm drive automotive axle construction having an underhung worm propeller shaft. Said axle comprises a tubular axle casing or housing 1 having driving shaft sections 2 therein, with a suitable differential mechanism mounted on the inner ends of said shaft sections and enclosed within a drum or casing 3. Mounted on the differential case 3 is a worm gear ring 4 which meshes with a worm 5 located below said worm gear on a propeller shaft 6. In the construction illustrated, the differential mechanism and the underhung worm propeller shaft 6 are mounted in a differential gear carrier 7 and are removable therewith as a unit. In the construction shown in the drawing, the axle housing 1 has an opening 8 in its bottom, at its middle, to receive the differential gear; and the gear carrier 7 is removably secured to the bottom of said housing and covers said hole.

The worm 5 is located within a lubricant containing chamber or reservoir 9 provided therefor in the bottom of the removable gear carrier 7; and the propeller shaft 6, on which said worm is formed, is supported in suitable anti-friction bearings 10 provided therefor at the ends of said chamber. The worm gear ring or wheel 4 is fixed on the differential gear case 3, which has hubs 11 projecting from its ends and mounted in anti-friction bearings 12 in upstanding pedestals 13, which form part of the gear carrier 7 and project upwardly into the axle housing 1 through the opening 8 that is closed by said gear carrier. The gear carrier 7 is provided adjacent to the outer ends of the bearings 12 for the gear case or drum 3 with drain openings 14 through which lubricant in the axle housing is returned to the reservoir 9 in the bottom of said carrier. The differential mechanism comprises two opposed bevel gears 15, located in the differential gear case 3 and splined on the inner ends of the respective axle sections 2 to rotate therewith. Interposed between and intermeshing with the opposed bevel gears 15 are bevel pinions 16 that are journaled on the radially extending studs 17 of a spider 18 arranged to rotate with the differential gear case 3.

In order to prevent lubricant in the chamber 9 in the lower portion of the gear carrier 7 from being forced away from the worm by the pumping action of the worm 5 and worm wheel 4, the worm and the portion of the worm wheel cooperating therewith are shrouded or enclosed in a hollow cylindrical housing or casing 19, which extends from end to end of said chamber and is preferably formed integral with the bottom thereof. The shroud or casing 19 has a reasonably close fit about the worm and is provided at its top with a longitudinal opening or slot 20 adapted to snugly receive the lower portion of the worm gear. Said worm casing or shroud is also provided adjacent each end thereof with two opposed openings 21 located one in each of its side walls for establishing communication between the chamber 9 and the interior of said shroud.

By the arrangement described, the worm 5 and the portion of the worm gear 4 cooperating therewith are enclosed within a substantially close fitting lubricant containing casing or shroud which serves to prevent the pumping action of said worm and worm gear from forcing the lubricant supplied thereto away therefrom, thereby securing proper lubrication of the intermeshing parts of the worm gearing at all speeds. This pumping action of the worm also secures a continuous circulation or flow of lubricant through the shroud, the lubricant being drawn into the shroud through the openings at one end thereof and delivered under slight pressure against the entering sides of the worm and worm wheel and then returned to the main lubricant chamber through the openings at the other end of said shroud into the main reservoir.

In the modified construction shown in Figs. 3, 4 and 5, the propeller shaft receiving opening in the rear wall of the reservoir 9a of the differential gear carrier 7a is closed by means of a closure cap 22, which is bolted or otherwise removably secured to said carrier. The end closure cap 22 has an inwardly extending annular flange 23 which fits the opening in the rear wall of the reservoir 9a and forms a pocket or seat for a suitable antifriction bearing 10a for supporting the rear end of the propeller shaft 6a. The worm 5a on the propeller shaft 6a is shrouded or enclosed in a cylindrical casing 19a which is provided at its top with an opening 20a that extends rearwardly from the forward end of said casing far enough to accommodate the lower portion of the worm wheel 4a. The forward end of this cylindrical casing or shroud 19a is supported in an annular recess 24 provided therefor in the forward end of the lubricant chamber or reservoir 9a; and the annular flange 23 of the closure cap 22 projects into the rear end of said shroud and thus constitutes support therefor.

The shroud 19a is provided at its opposite ends with notches adapted to form openings 21a in the lower portion of said shroud that permit lubricant in the chamber to enter the ends of said shroud. The lower portion of the shroud 19a is also provided adjacent to the downwardly moving side of the worm 4a (assuming the worm to be turning clockwise) with an elongated lubricant inlet opening or slot 25 that extends longitudinally of the shroud substantially from end to end of the worm. As shown in Figs. 3 and 4 of the drawings, the upper portion of the lubricant containing chamber 9a of the gear carrier 7a is provided at each end with inwardly extending projections or flanges 26 that terminate close to the peripheral face of the worm gear 4a and operate as scrapers to prevent the lubricant in said chamber from being carried by said worm gear into the upper part of the axle housing 1a.

The modified construction of shroud 19a shown in Figs. 3, 4 and 5 operates in the same manner as the shroud 19 illustrated in Figs. 1 and 2; that is, it serves to hold the lubricant around the worm and secures a continuous circulation of flow of the lubricant through the shroud and delivers the lubricant under slight pressure against the entering sides of the worm and worm wheel. The shroud 19a, however, is separate from the gear carrier and may thus be quickly and easily mounted in and removed from the carrier through the propeller shaft receiving opening at the rear end of the lubricant chamber or reservoir.

Obviously, the hereinbefore described construction admits of considerable modification without departing from the invention. Therefore, I do not wish to be limited to the precise details of construction shown and described.

What I claim is:

1. A housing having a lubricant containing chamber at the bottom thereof, a worm gear mounted in said housing above said chamber, a worm meshing with said gear, said worm being located in said chamber underneath said gear, and a hollow cylindrical casing located in said chamber and enclosing the worm and the portion of the gear cooperating therewith.

2. A housing having a lubricant containing chamber at the bottom thereof, a worm gear mounted in said housing above said chamber, a worm meshing with said gear, said worm being located in said chamber underneath said gear, and a hollow cylindrical casing located in said chamber and enclosing the worm and the portion of the gear cooperating therewith, said casing being provided adjacent to the ends of said worm with openings communicating with said chamber.

3. A worm drive axle construction comprising a housing, driving axle sections in said housing, differential mechanism including a worm gear operatively connected to said axle sections for driving the same, a carrier secured to said housing and supporting said differential mechanism, said carrier having a lubricant containing chamber at the bottom thereof, and a propeller shaft journaled in said carrier and having a worm thereon located in said chamber and meshing with the lower part of said worm gear, said chamber having a tubular casing therein which extends from end to end of the chamber and encloses the worm and the portion of the worm gear cooperating therewith, said casing being provided with openings for establishing communication between the chamber and casing at the ends of the worm.

4. A housing having a lubricant containing chamber, a worm gear mounted in said housing above said chamber, a worm located in said chamber underneath said gear and meshing with the latter, and a hollow cylindrical casing located in said chamber and enclosing said worm and the portion of the worm gear meshing therewith, the lower portion of said casing communicating at each end with said chamber.

5. A housing having a lubricant containing chamber, a worm gear mounted in said housing above said chamber, a worm located in said chamber underneath said gear and meshing with the latter, and a hollow cylindrical casing located in said chamber and enclosing said worm, said casing having an opening in the top adapted to receive the adjacent portion of said worm gear, said casing being provided at and intermediate its ends with openings communicating with said chamber.

6. A housing having a lubricant containing chamber, a worm gear mounted in said housing above said chamber, a worm meshing with said gear, said worm being located in said chamber underneath said gear, and a hollow cylindrical casing located in said chamber and enclosing said worm and the portion of the worm gear meshing therewith, said casing communicating at its ends with said chamber and being provided intermediate its ends and on the downwardly moving side of said worm with an opening communicating with said chamber.

7. A worm drive axle construction comprising a housing, driving axle sections in said housing, differential mechanism including a worm gear operatively connected to said axle sections for driving the same, a carrier secured to said housing and supporting said differential mechanism, said carrier having a lubricant containing chamber in the lower portion thereof, said lubricant chamber being provided at one end with an opening, a closure cap for said opening, a propeller shaft adapted to be inserted in and removed from said lubricant chamber through said opening and having a worm therein located in said chamber and meshing with the lower part of said worm gear, and a tubular casing mounted in said chamber and enclosing the worm and the portion of worm gear cooperating therewith, said casing being adapted to be inserted in and removed from said chamber through the opening therein.

8. A worm drive axle construction comprising a housing, driving axle sections in said housing, differential mechanism including a worm gear operatively connected to said axle sections for driving the same, a carrier secured to said housing and supporting said differential mechanism, said carrier having a lubricant containing chamber at the bottom thereof, said lubricant chamber being provided at one end with an opening, a closure member for said opening, a propeller shaft adapted to be inserted in and removed from said lubricant chamber through said opening and having a worm thereon located in said chamber and meshing with the lower part of said worm gear, and a cylindrical casing sleeved on said propeller shaft and enclosing said worm, said casing having an opening in its top adapted to receive the lower portion of the worm wheel, the lower corners of said casing being notched to provide openings at the ends thereof that established communication between said casing and said chamber.

9. A worm drive axle construction comprising a housing, driving axle sections in said housing, differential mechanism including a worm gear operatively connected to said axle sections for driving the same, a carrier secured to said housing and supporting said differential mechanism, said carrier having a lubricant containing chamber at the bottom thereof, said lubricant chamber being provided at one end with an opening, a closure member for said opening, a propeller shaft adapted to be inserted in and removed from said lubricant chamber through said opening and having a worm thereon located in said chamber and meshing with the lower part of said worm gear, and a cylindrical casing sleeved on said propeller shaft and enclosing said worm, said casing having an opening in its top adapted to receive the lower portion of the worm wheel, the lower corners of said casing being notched to provide openings at the ends thereof, said casing being provided intermediate said notches with a longitudinal slot.

10. A worm drive axle construction comprising a housing, driving axle sections in said housing, differential mechanism including a worm gear operatively connected to said axle sections for driving the same, a carrier secured to said housing and supporting said differential mechanism, said carrier having a lubricant containing chamber at the bottom thereof, said lubricant chamber being provided at one end with an opening, a closure member for said opening, a propeller shaft adapted to be inserted in and removed from said lubricant chamber through said opening and having a worm thereon located in said chamber and meshing with the lower part of said worm gear, and a cylindrical casing sleeved on said propeller shaft and enclosing said worm, said casing having an opening in its top adapted to receive the lower portion of the worm wheel, the lower corners of said casing being notched to provide openings at the ends thereof, said casing being provided intermediate said notches and opposite the downwardly moving side of said worm with a longitudinal slot.

11. A worm drive axle construction comprising a housing, driving axle sections in said housing, differential mechanism including a worm gear operatively connected to said axle sections for driving the same, a carrier secured to said housing and supporting said differential mechanism, said carrier having a lubricant containing chamber at the bottom thereof, said lubricant chamber being provided at one end with an opening, a closure member for said opening, a propeller shaft adapted to be inserted in and removed from said lubricant chamber through said opening and having a worm thereon located in said chamber and meshing with the lower part of said worm gear, and a cylindrical casing sleeved on said propeller shaft and enclosing said worm, said casing having an opening in its top adapted to receive the lower portion of the worm wheel, the lower corners of said casing being notched to provide openings at the ends thereof, said casing being provided intermediate said notches and opposite the downwardly moving side of said worm with a longitudinal slot, one end of said casing being supported on the closure member for the opening at one end of said chamber and the other end of said chamber being provided with an annular recess adapted to support the other end of said casing.

12. A shroud for worm gearing having an underhung worm, said shroud comprising a cylindrical casing adapted to enclose the worm and having an opening at its top adapted to receive the adjacent lower portion of the worm gear, the lower portion of said casing being provided on one side intermediate its ends with a longitudinal opening.

13. A shroud for worm gearing having an underhung worm, said shroud comprising a cylindrical casing adapted to enclose the worm and having an opening at its top adapted to receive the adjacent lower portion of the worm gear, the lower portion of said casing being provided on one side intermediate its ends with a longitudinal opening and at its lower corners with notches.

Signed at Detroit, Michigan, this 13th day of November, 1929.

MATHEW B. MORGAN.